Patented Mar. 27, 1923.

1,449,718

UNITED STATES PATENT OFFICE.

WILBUR L. WRIGHT, OF FULTON, NEW YORK.

ART OF RENDERING PAPER MATERIAL GREASEPROOF.

No Drawing.   Application filed April 28, 1920.   Serial No. 377,230.

*To all whom it may concern:*

Be it known that I, WILBUR L. WRIGHT, a citizen of the United States, and resident of Fulton, county of Oswego, State of New York, have invented certain new and useful Improvements in and Relating to the Art of Rendering Paper Material Greaseproof, of which the following is a specification.

This invention relates to certain improvements in the art of greaseproofing paper and other fibrous material; and the objects and nature of the invention will be readily understood by those skilled in the art in the light of the following disclosure:

An object of the invention is to provide for the coating of paper and other fibrous material by improved means, to render the same impervious to grease and if need be both grease and moisture.

A further object of the invention is to provide an exceedingly efficient and advantageous grease proofing composition for paper and other fibrous material, that overcomes various disadvantages incidental to the production, application and use of compositions heretofore produced for this purpose.

With these and other objects in view, my invention embodies coating compositions, methods, and paper and other fibrous material provided with a peculiar coating substantially as set forth and specified hereinafter.

My greaseproofing composition in its preferred embodiment comprises casein and a vegetable oil that is soluble in or will compound with water.

This composition can be composed of ingredients approximately in proportions about, as follows, to wit:

Casein 200 parts.
Emulsified cocoanut oil 100 parts.
Water 1000 parts.
Ammonia 10 parts.

However, I do not wish to limit myself to the proportions as stated above, as these proportions can be greatly varied, nor do I wish to limit myself to the ingredients mentioned as other ingredients can be added, and in the casein composition other ingredients can be used instead of the cocoanut oil to perform the functions of such oil.

Also, in a composition employing cocoanut oil, another adhesive, gelatinous or body forming material than casein might be employed.

I make these allegations because I believe myself to be the first to employ casein to constitute in whole or in part, the adhesive, gelatinous or body forming ingredient of a grease proofing or of a grease and water proofing composition; and I also believe I am the first to employ soluble cocoanut oil to constitute, in whole or in part, the ingredient of a grease or grease and water proofing composition that determines the flexibility of a coating formed by such composition, whether or not the body of such a composition is formed by casein or some other ingredient.

In preparing the composition hereinbefore described, the casein is dissolved in any suitable manner. For instance, I usually mix the casein with a suitable proportion of diluted ammonia and allow the mixture to stand for a suitable length of time, say for six hours more or less. I then add the remainder of the proportion of water and the proportion of soluble cocoanut oil. This mixture is heated to a suitable temperature to complete the dissolving of the casein and its mixture with the oil. For instance, the mixture is heated to approximately one hundred and seventy five degrees Fah. and maintained approximately at this temperature for the length of time necessary to bring about the result desired.

Before using the composition as thus produced, it is preferably filtered or decanted to remove undissolved portions of casein.

This composition is applied in any suitable manner or by any suitable means, to the paper or other fibrous material, in the sheet, or to articles of commerce, such as paper containers or the like, to form a coating thereon or to coat the fibers composing the paper material.

The coating is grease proof and renders the paper material impervious, and the thickness of the coating on the paper material can be controlled by varying the proportion of casein in the composition.

The particular example hereinbefore described, forms a coating of a light yellow color, a coating that is as pure and clean as any food products that will be brought into contact therewith.

The coating is rendered flexible against cracking, lining, checking and breaking by the cocoanut oil and furthermore the composition can be applied either hot or cold, which constitutes a decided advantage.

If so desired, my composition can be utilized in the process of making paper so that the finished paper will be impervious. This result can be attained by adding suitable proportions of my composition to the paper stock or pulp in the beater or to the unfinished paper material at some other stage in the paper making process.

In so far as the broad feature of my invention is concerned with respect to the use of casein, glycerine, lime, or some other agent can be employed to render the coating flexible, instead of cocoanut oil.

Also, so far as the broad feature of my invention with respect to cocoanut oil is concerned, some other body than casein might be employed, for instance gelatine.

Where conditions require an unusually hard yet flexible coat, this result can be attained by adding a suitable proportion of formaldehyde, or a suitable proportion of tannic acid, to the composition.

If desired suitable proportions of sugar or glucose can be added to the composition.

What I claim is:—

1. Fibrous material having a flexible coating to render the same grease proof, said coating embodying a composition of body-forming adhesive and a vegetable oil.

2. Paper material having a flexible grease proofing coating embodying a composition of dissolved casein and vegetable oil for rendering the coating flexible, the proportion of casein being relatively large.

3. A grease proofing composition for fibrous material embodying a mixture of dissolved casein and cocoanut oil.

WILBUR L. WRIGHT.